United States Patent

[11] 3,574,408

[72] Inventor Adolph Ronning
 4826 E. Weldon Ave., Phoenix, Ark. 85018
[21] Appl. No. 764,050
[22] Filed Oct. 1, 1968
[45] Patented Apr. 13, 1971

[54] VEHICLE WHEEL MOUNTING ASSEMBLY
 5 Claims, 15 Drawing Figs.
[52] U.S. Cl.................................................. 301/132,
 308/96, 308/187, 280/124
[51] Int. Cl........................................................ B60b 35/06
[50] Field of Search............................................ 301/1, 126,
 9 (TV), 128, 5, 131, 132; 287/53; 305/14; 267/57
 (Cursory); 308/96, 101, 103, 187

[56] References Cited
 UNITED STATES PATENTS

| | | | |
|---|---|---|---|
| 1,004,203 | 9/1911 | Ross.............................. | 287/53 |
| 2,370,773 | 3/1945 | Bradley......................... | 301/132 |
| 2,442,903 | 6/1948 | O'Harrow...................... | 301/132 |
| 2,926,968 | 3/1960 | Toth.............................. | 305/14X |
| 3,347,110 | 10/1967 | Wilson.......................... | 287/53X |
| 1,751,453 | 3/1930 | Beemer......................... | 308/187 |
| 2,250,167 | 7/1941 | Niles............................. | 308/187X |

Primary Examiner—Richard J. Johnson
Attorney—Drummond and Cahill

ABSTRACT: A vehicle wheel mounting assembly is positioned on a pivoted spring-loaded arm secured to a vehicle frame. Two identical assemblies are mounted adjacent each other but displayed longitudinally along the longitudinal axis of the vehicle. The assembly is reversible and is therefor interchangeable without variation. The wheel mounting assembly includes a wheel spindle carrier formed integrally at one end of one of the spring-loaded pivoted arms. The spindle carrier includes at the end remote from the vehicle frame an opening extending therethrough having an axis substantially horizontal and extending substantially transverse to the longitudinal axis of the vehicle. A wheel spindle is inserted in one end of the opening in the spindle carrier and includes a shoulder for abutting the periphery of the opening. An ejector shaft extends into the carrier from the opposite end and threadedly engages the wheel spindle. The spindle supports wheel bearings and a hub including a brake drum thereon to which a wheel and tire may be secured.

INVENTOR.
ADOLPH RONNING

INVENTOR.
ADOLPH RONNING

INVENTOR.
ADOLPH RONNING
BY Drummond & Cahill
ATTORNEYS

INVENTOR.
ADOLPH RONNING
BY
Drummond & Cahill
ATTORNEYS

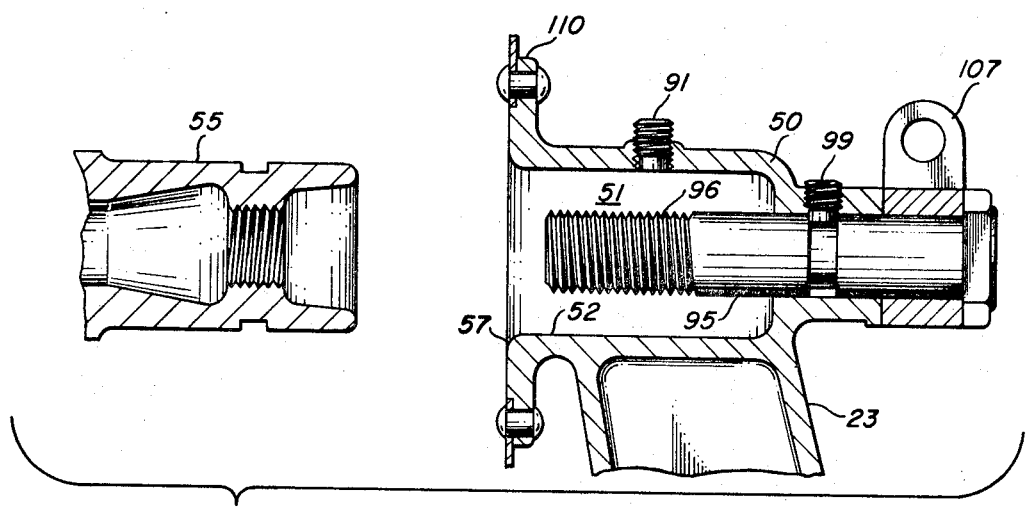
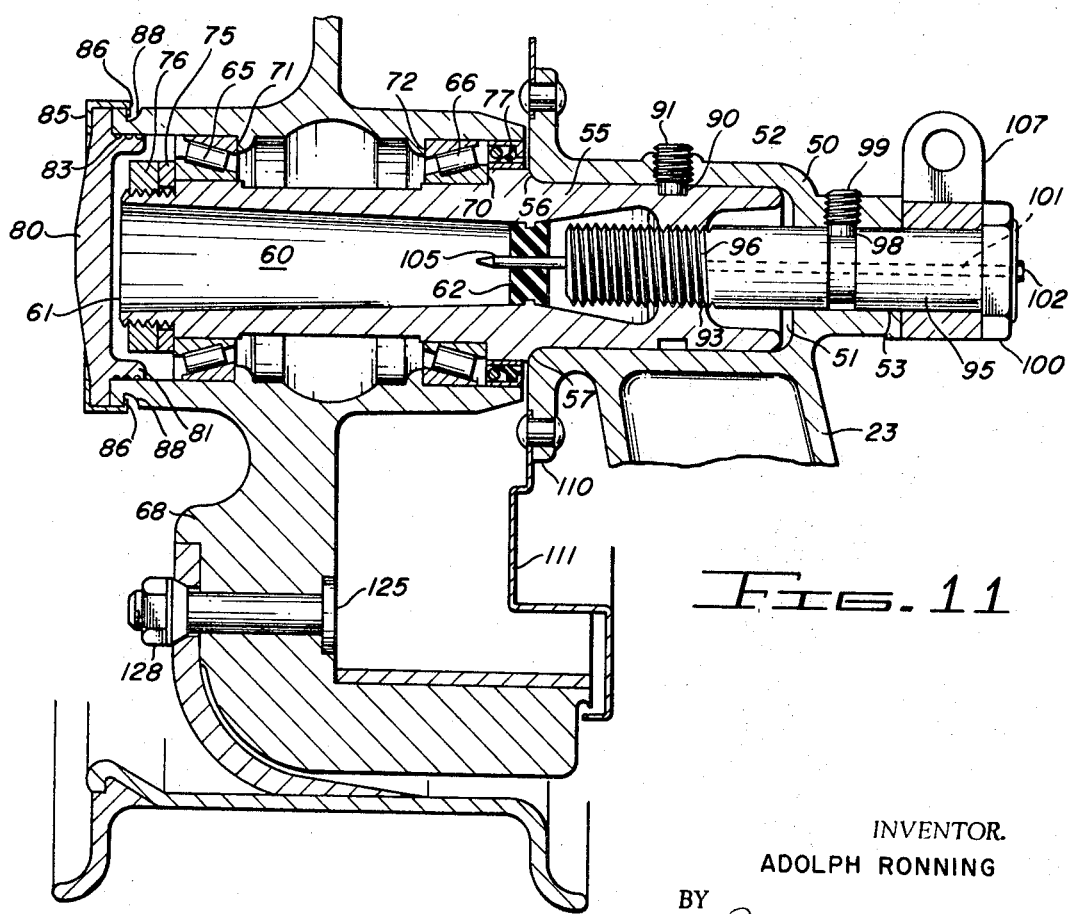

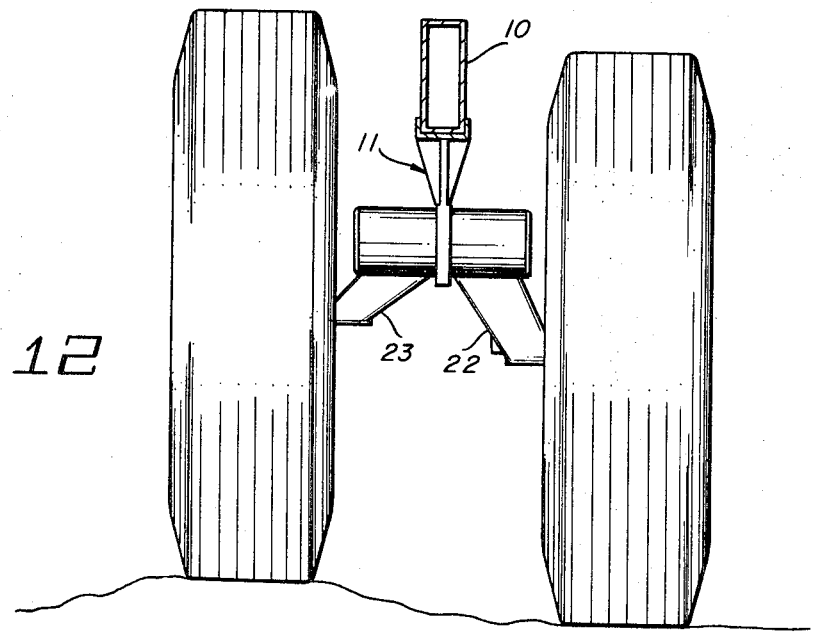
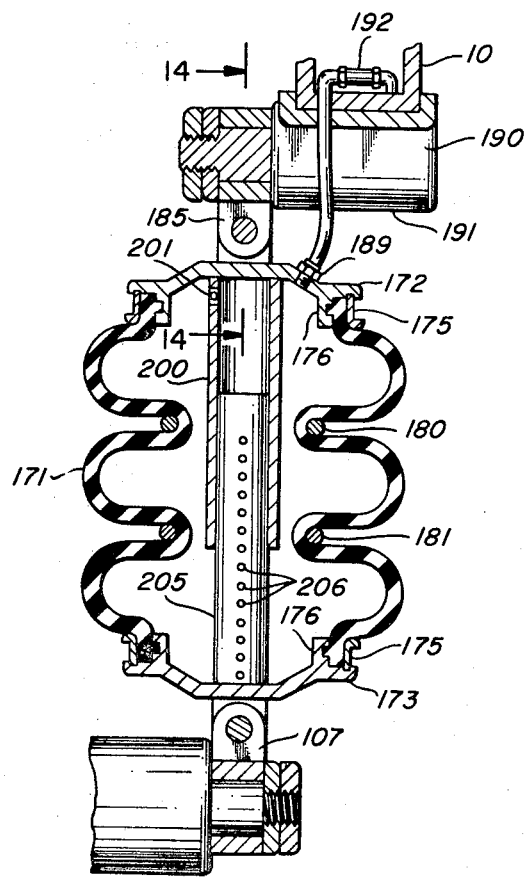
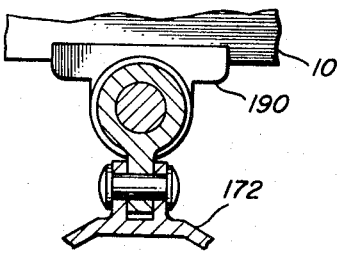
Fig. 12
Fig. 14
Fig. 13
INVENTOR.
ADOLPH RONNING

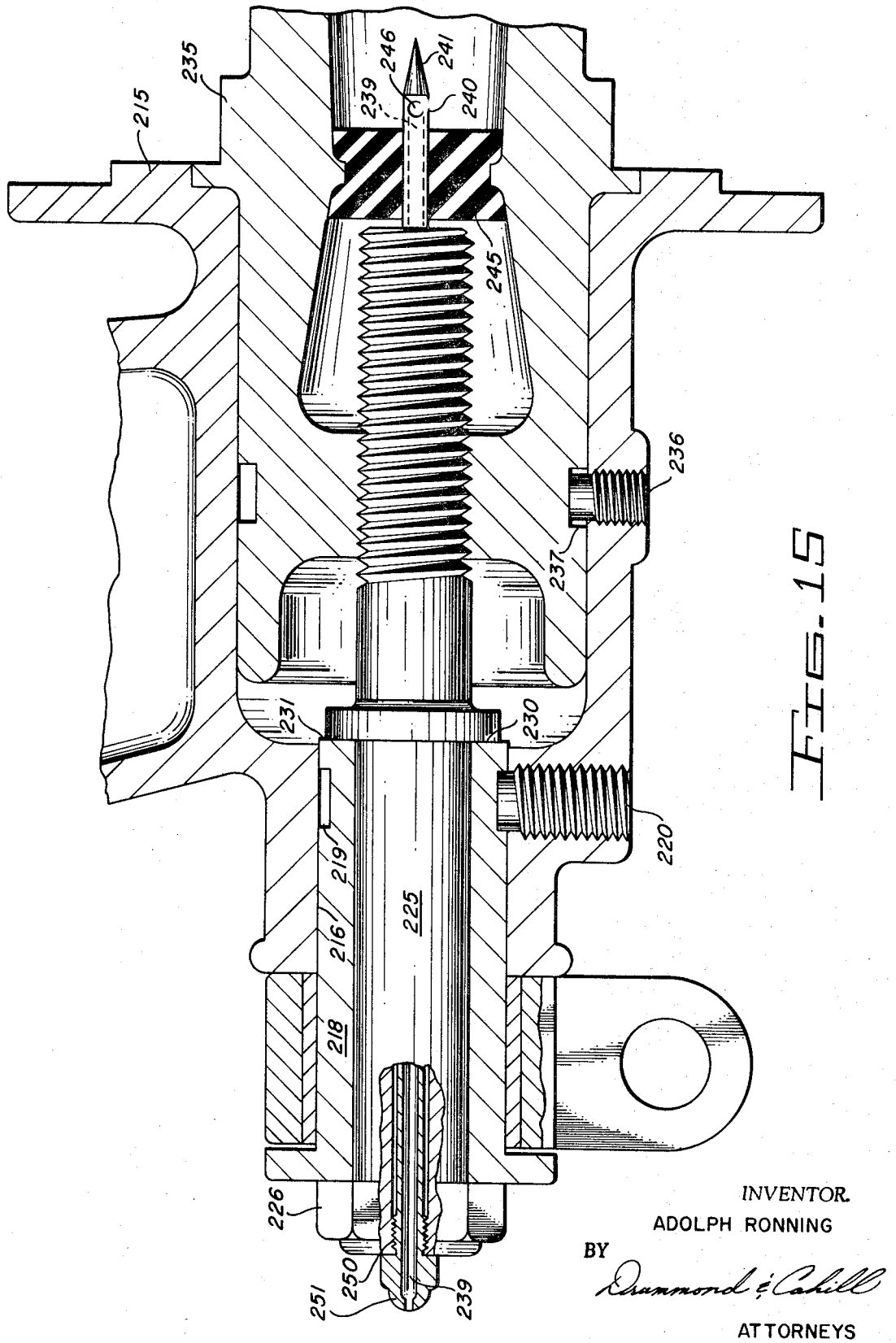

VEHICLE WHEEL MOUNTING ASSEMBLY

The present invention pertains to vehicle wheel systems, and more particularly, to a novel arrangement for mounting a vehicle wheel assembly.

It is highly desirable to provide a vehicle common carrier that can readily be converted for use as a trailer and/or as a self-propelled vehicle and also one that can quickly accommodate the attachment of a large variety of wheel and tire specifications for use in various vehicle categories. Some of these are highway cargo transports, motor trucks, busses, automobiles, ordnance vehicles, tractors and agricultural or farm transports. This wheel mounting assembly must therefore have means for quickly applying and/or interchanging wheels having a variety of characteristics. For an example, the category herein selected for special consideration is that related to trailers, semitrailers, motor trucks, etc. The structures herein shown are adaptable for use with or without differential or compensating wheel action. They are also adaptable for use with either a trailer or an integrated power wheel.

The care and maintenance of vehicle wheel assemblies, particularly on trucks, trailers, and other heavy equipment, is of vital importance and substantial expense. Removing a wheel assembly from a large vehicle presently entails the utilization of a substantial length of time and use of numerous tools. For example, to remove and inspect wheel bearings or brake linings on a wheel spindle requires equipment to be found only in a well-equipped shop. Lubrication of the bearings in these assemblies is frequently nothing better than guesswork, even through absolutely vital to the economic life of the wheel assembly; further, assuring proper lubrication level and freedom from contamination of the lubricant is a difficult and sometimes impossible task using prior art wheel assemblies.

It is therefore an object of the present invention to provide a vehicle wheel mounting assembly that may be removed simply by ejection from a carrier.

It is also an object of the present invention to provide a bearing lubrication system within a wheel mounting assembly that may be maintained free of contaminants.

It is still another object of the present invention to provide a vehicle wheel mounting assembly wherein the assembly is provided with a proper amount of lubricant prior to its mounting on the vehicle and while it is in storage.

It is still another object of the present invention to provide a vehicle wheel mounting assembly that is lightweight without sacrificing strength.

These and other advantages of the present invention will become apparent to those skilled in the art as the description thereof proceeds.

Briefly, in accordance with the embodiment chosen for illustration, a vehicle wheel mounting assembly is pivotally secured to a vehicle frame and an arm thereof extends rearwardly and downwardly from the pivot point and terminates in a wheel spindle carrier. The spindle carrier incorporates an opening extending horizontally and substantially transversely to the longitudinal axis of the vehicle. One en of the opening accepts a wheel spindle having a shoulder thereon that abuts the carrier; the other end of the opening accepts an ejector shaft which threaded engages the spindle within the carrier. The ejector shaft is permitted to rotate within the carrier but is locked against movement axially of the carrier opening by a setscrew extending through the carrier and engaging an annular channel in the ejector shaft. An axially extending passageway is provided within the ejector shaft and a pointed extension communicating with the passageway extends from the ejector shaft inwardly of the carrier toward the wheel spindle. The interior of the wheel spindle is hollow and forms, together with wheel bearings and seals as well as an end cap, an oil reservoir which is sealed against intrusion of contaminants. The hollow spindle also includes a puncturable seal that is punctured by the pointed extension on the ejector shaft so that when the spindle is mounted in the spindle carrier, the interior of the spindle communicates through the passageway in the ejector shaft to the atmosphere to provide venting and also to provide a means for replenishing oil in the reservoir.

The present invention may more readily be described by reference to the accompanying drawings, in which:

FIG. 10 is an enlarged cross-sectional view, partially exploded, showing a wheel spindle removed from its carrier.

FIG. 11 is an enlarged cross-sectional view of a portion of FIG. 6 useful in describing details of the present invention.

FIG. 12 is a front elevational view of one of the vehicle wheel mounting assemblies shown in FIG. 1 with a wheel and tire mounted thereon, and a corresponding adjacent wheel assembly shown in an elevated position as it passes over uneven ground.

FIG. 13 is a cross-sectional view of the integral shock absorber and hydroair bellows of FIG. 1.

FIG. 14 is a front elevational view of a portion of FIG. 13 taken along line 14–14.

FIG. 15 is a cross-sectional view of a modification of a portion of the apparatus shown in FIG. 11.

Figure 1:
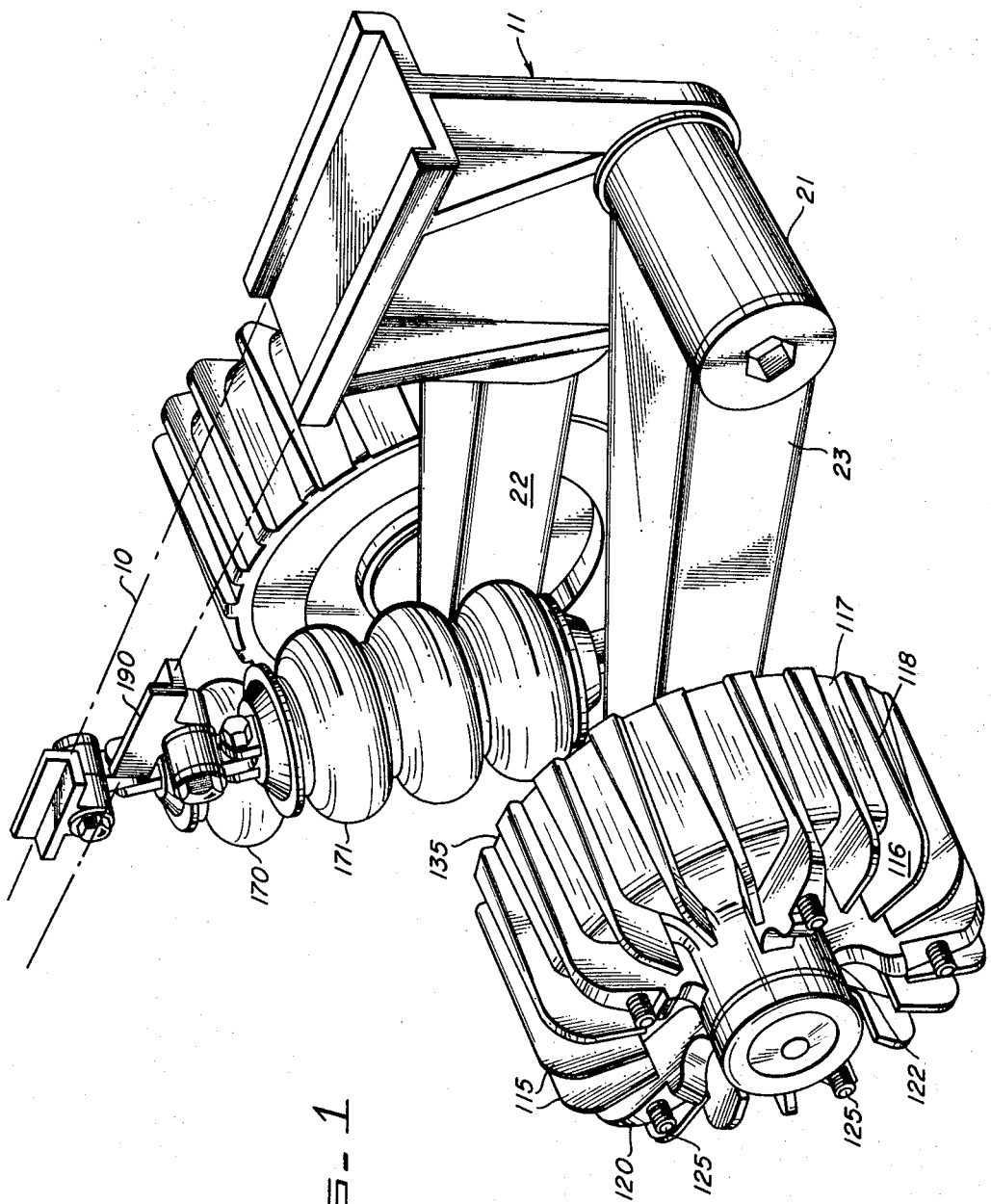
FIG. 1 is a perspective view of a vehicle suspension system utilizing longitudinally staggered wheel assemblies constructed in accordance with the teachings of the present invention.
Figure 2:
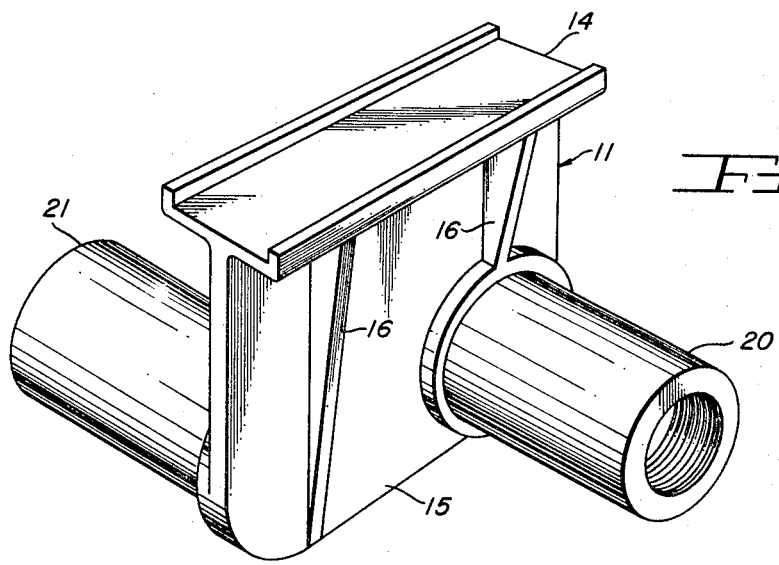
FIG. 2 is a perspective view of an assembly carrier for attachment to a vehicle frame to support the wheel mounting assemblies of the present invention.
Figure 3:
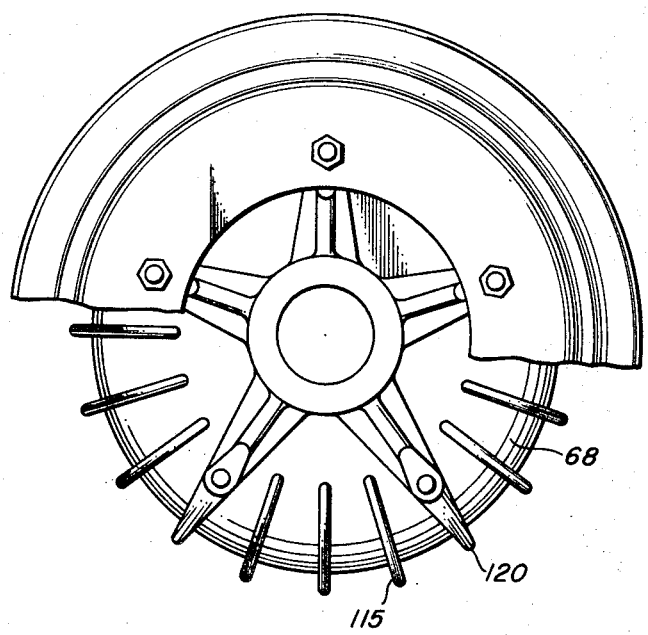
FIG. 3 is a side elevational view showing a finned brake drum and a partially broken-away wheel assembly mounted thereon.
Figure 8:
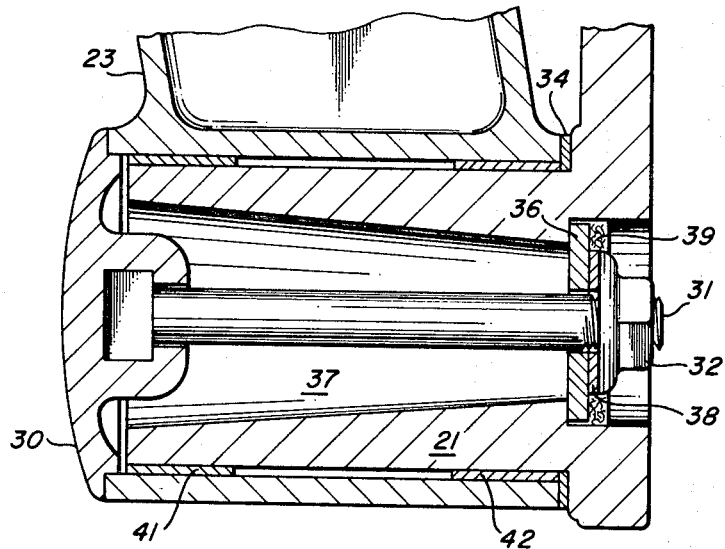
FIG. 8 is an enlarged cross-sectional view of a modification of a portion of FIG. 6.
Figure 9:
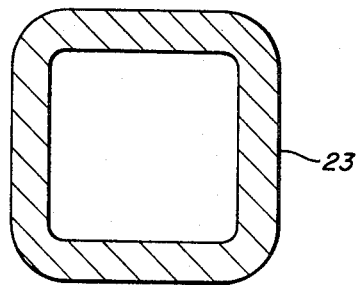
FIG. 9 is a cross-sectional view of the assembly carrier arm shown in FIG. 6 taken along line 9–9.

Referring now to the drawings, a vehicle frame, shown in broken lines in FIG. 1 at 10, is used as an anchor point for an assembly carrier 11. Details of the assembly carrier 11 may be seen by reference to FIG. 2 wherein it may be seen that the carrier includes an integral channel member 14 with a depending vertical wall 15 and integral gusset members 16. The assembly carrier may be secured to the vehicle frame in any convenient manner and, in turn, supports two stub shafts 20 and 21, each of which forms a pivot for an assembly carrier arm 22 and 23 respectively. Since each assembly carrier arm and wheel mounting assembly is identical, further discussion regarding the assembly will be confined to that assembly supported by the assembly carrier arm 23. The arm 23 may be mounted on the stub shaft 21 and held thereon by an end cap 25 screwed into the internally threaded portion 26 of the stub shaft 21. Alternatively, the arm 23 may be mounted in a manner shown in the modification of FIG. 8 wherein it may be seen that the stub shaft 21 is not threaded. End cap 30 is held securely against the arm 23 and does not engage the end of the stub shaft 21. A retainer bolt 31 extends axially of the stub shaft and a nut 32 on the bolt 31 is used to draw the end cap 30 into firm engagement with the arm 23, forcing the latter against a bronze bushing 34. In this manner, there is no relative motion between the end cap and the arm 23, eliminating what might otherwise be a source of contaminants. A steel washer 36 covers the conical opening 37 in the stub shaft 21 and a bronze bushing 38 permits relative motion between the locknut 32 and the stub shaft 21. A felt sealing ring 39 is positioned circumferentially about the bronze bushing 38. Oil retaining bronze bushings 41 and 42 permit easy relative motion between the arm 23 and the stub shaft 21.

The assembly carrier arm 23 terminates in a wheel spindle carrier 50 cast integrally therewith. The spindle carrier includes an opening 51 extending therethrough having an axis substantially in a horizontal plane and transverse to the normal direction of motion of the vehicle. The opening 51, in the embodiment chosen for illustration, includes a large diameter portion 52 and a small diameter portion 53. The portion 52 receives a wheel spindle 55 having a shoulder 56 thereon for abutment against a corresponding shoulder 57 on the carrier. The spindle includes a circular tapered opening 60 extending therethrough having its greatest diameter at the end 61 remote from the carrier 50 and having its least diameter at a position approximately radially inwardly from the shoulder 56. The tapering of the internal opening reduces the weight of the spindle while nevertheless permitting the strength of the spindle to be maintained in accordance with the requirements along its length. A puncturable seal 62 is positioned at the small diameter portion of the opening 60 in the spindle 55 for purposes to be described more fully hereinafter. Bearings and races 65 and 66 are positioned on the exterior of the spindle 55 to permit the rotation of the finned drum 68 relative to the spindle 55. The bearing races are maintained in their respective positions by shoulder 70 on the spindle, shoulders 71 and 72 on the drum assembly 68, and ring 75 held in position by locknut 76 threadedly engaging the spindle 55. An oil seal 77 is positioned adjacent the bearing and race 66. A transparent end cap 80 including a cylindrical extension 81 sealingly engages the interior of the drum assembly 68. Circumferential grooves 83 in the cylindrical extension 81 contact the interior bore of the drum assembly 68 to provide the necessary sealing. The end cap 80 is maintained in position by a spring clip 85 that may be snapped into position to cause fingers 86 to engage detents 88 in the drum assembly 68. Spring clip 85 may also be fabricated from a relatively pliable metal allowing it to be hermetically sealed by crimping its edge and pressing it firmly into and around groove 88 of drum assembly 68.

The drum assembly 68 and the spindle 55, together with the bearings 65 and 66, end cap 80, locknut 76, and puncturable seal 62 may be preassembled and filled with lubricant to the required level prior to installation on the vehicle. The opening 60 in the interior of the wheel spindle 55 acts as a reservoir sealer against the atmosphere and contamination. The lubricant has access out of the end 61 of the spindle 55 to the bearings and is prevented from escaping by reason of the seals 77.

The wheel spindle 55 extends into the spindle carrier 50 and includes an annular channel 90 for receiving a setscrew 91 threaded through the carrier 50. The spindle is provided with internal threads 93 for reasons to be described later.

An ejector shaft 95 extends into the smaller diameter portion 53 of the carrier 50 and includes a threaded portion 96 for engaging the internal threads 93 of the spindle. The ejector shaft 95 also includes an annular channel 98 for receiving a setscrew 99 threadedly extending through the carrier 50. One end of the shaft 95 is terminated in a boltlike hexagonal head 100 to permit a wrench to be placed thereon to cause the shaft to turn. A passageway 101 extends axially through the shaft 95 and is capped on one end thereof by a small bolt 102. An extension 105 having the passageway 101 extending therethrough protrudes from the threaded end of the shaft 95. The hydroair bellows forming the spring portion of the suspension system (to be described) is connected to a shackle 107 surrounding the shaft 95.

The spindle carrier 50 includes a flange 110 to which is riveted or otherwise securely attached a brake backing plate 111 which carries, as a composite, the brakeshoes, actuating cylinders and other conventional brake parts (not shown).

The brakedrum assembly 68 includes a one-piece casting having integral fins 115 thereon. The fins 115 extend radially outwardly and include a portion 116 positioned on the outer face of the drum 117 and an axially extending portion 118 extending backwardly from the front face of the drum 117.

Certain fins 120 have thickened radial portions extending inwardly from the hub 122 of the drum 117 to provide sufficient thickness to accommodate an opening for wheel lugs 125.

Figure 7:
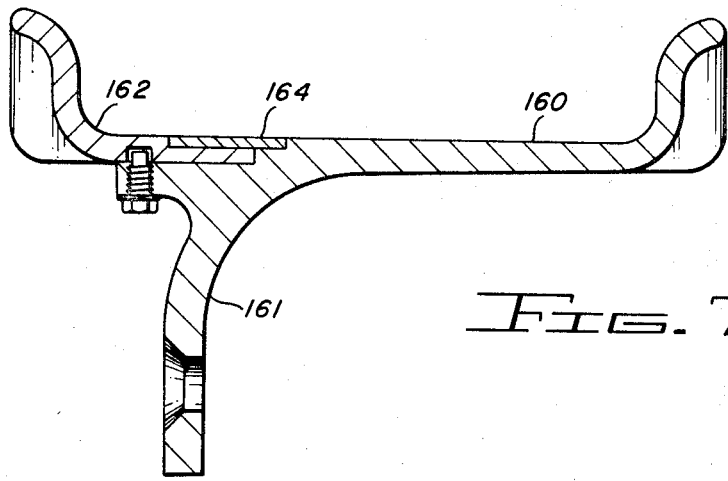
FIG. 7 is an enlarged cross-sectional view of a portion of a wheel rim showing a modification of the rim shown in FIG. 6.

A rim 150 is secured to a supporting wheel 151 such as by welding; the wheel includes a plurality of beveled openings 152 to permit wheel lugs to pass therethrough and to accept the tapered surfaces of a lug nut 155. An alternative form of a wheel and rim is shown in FIG. 7 wherein the rim 160 is formed integral with the wheel 161 and a split rim 162 lockably engages the rim 160. To permit the use of tubeless-type tires on the rim, the point between the rim portions 160 and 162 may be covered by a rubberized sealing band 164. The inside curvature of the wheel 151 conforms to the curvature of the axially extending portions 118 of the fins 115 on the drum 117. Further, the drum 117 is tapered to include a thicker section as shown at 127 to provide a passageway beginning at the interior 128 of the drum extending around the interior of the wheel 151 in between the fins 115 and ending at the interior 129 of the drum and wheel. It may be seen that air entering at 128 such as shown by the arrow 131 is forced by centrifugal force imparted thereto by the fins 115 to flow into and around a smoothly curved passageway having an exiting opening at 129 smaller than the entrance. The air as shown by the arrow 132, as it approaches the exit 129, increases its velocity by reason of the reduced area of the passageway. The reduction in area is a result of the increased section thickness at 127 of the drum 117 as well as increased fin thickness as the fins extend from the outside to the inside of the drum. This variation in fin thickness may best be seen by reference to FIG. 1 wherein it may be seen that fins 115 become slightly thicker in section as the axially extending portions 118 approach the rear face 135 of the drum 117. This decrease of the passageway for the conduction of air forced by centrifugal force from one side of the drum 117 to the other side is therefore accompanied by a substantial increase in velocity as a result of the venturi affect caused by the substantial decrease in cross-sectional area in the passageway. It may be noted that the passage of air is unobstructed and the entire passageway is formed by straight or continuously curving portions to present the least resistance in the flow of air therethrough.

This arrangement of air passage provides cooling for the drum and brake lining; however, a significant advantage is the conduction of heat by the air from the wheel, wheel rim, and tire. This latter conduction is particularly decisive since the air naturally flows to the outermost wall of the passageway, thereby decreasing laminar insulation of air layers therealong.

A brake lining 136 typically comprising a noncorrosive alloy is bonded to the interior of the drum 117. The brake lining may be secured in place by well-known techniques incorporating processes which provide molecular bonding between the lining and the metal of the drum.

Figure 4:
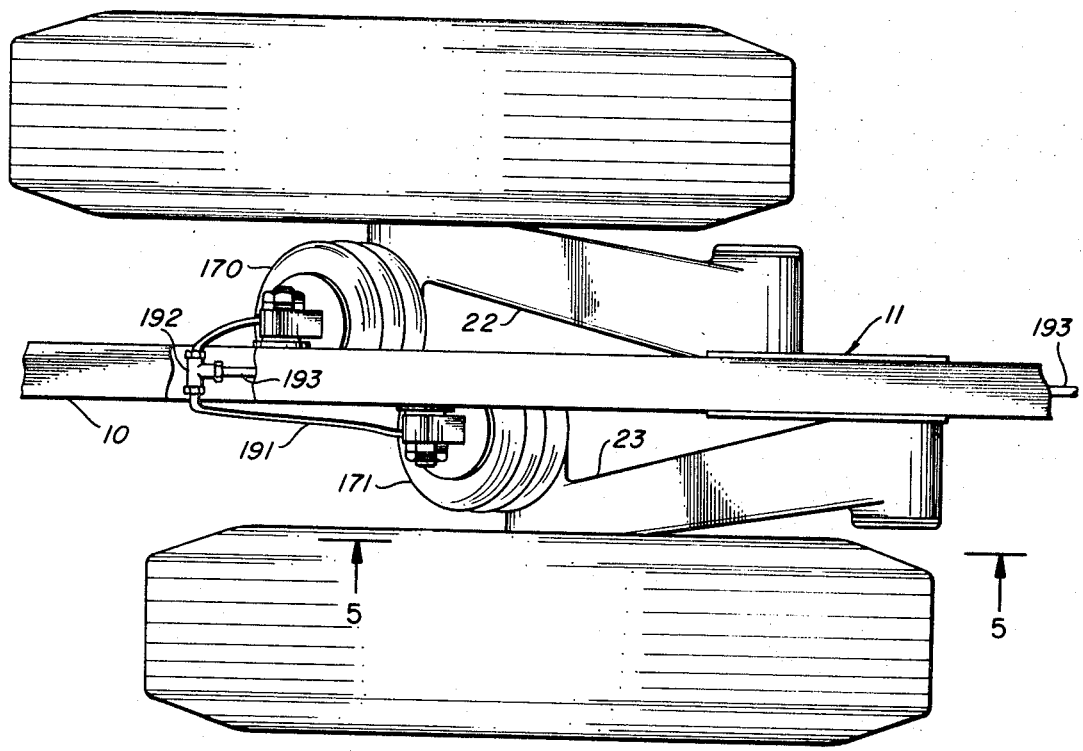
FIG. 4 is a top view of the apparatus shown in FIG. 1 with wheels and tires mounted.
Figure 5:
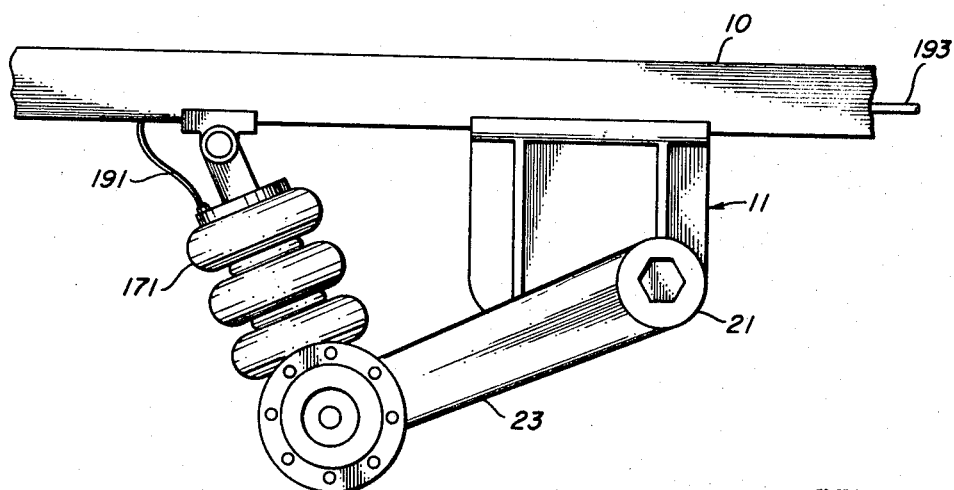
FIG. 5 is a side elevational view of a portion of FIG. 4 taken along line 5–5.
Figure 6:
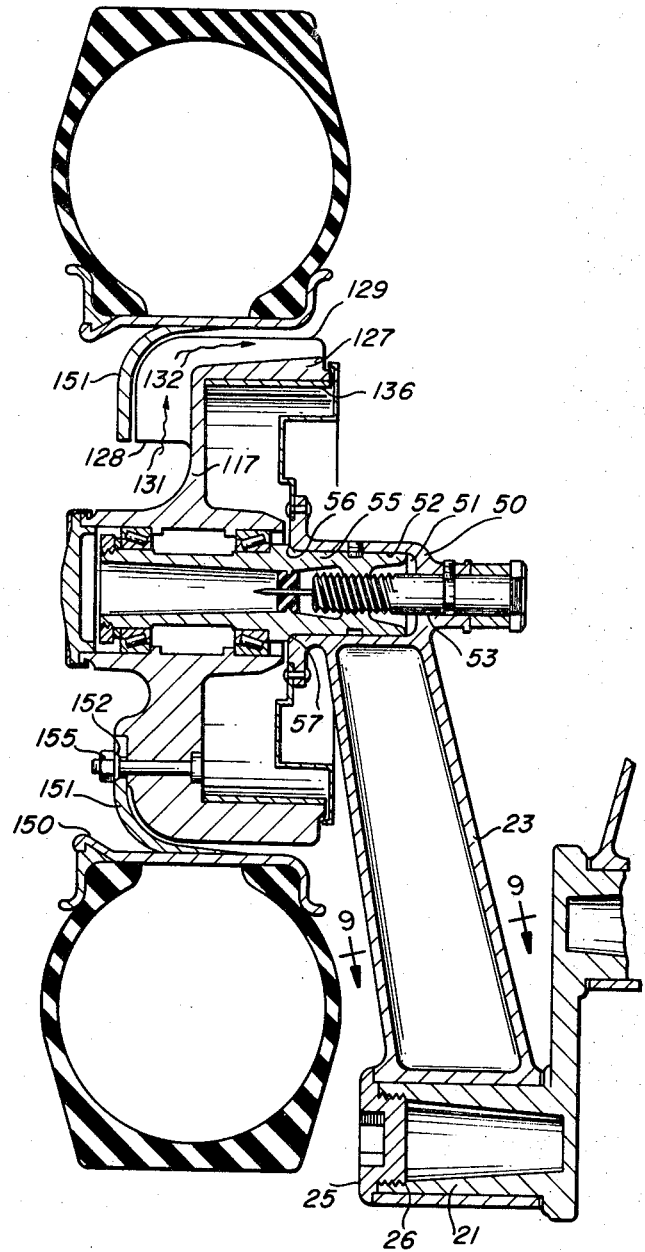
FIG. 6 is a top cross-sectional view of one of the vehicle wheel mounting assemblies of FIG. 1.

The spring-shock absorber combination shown in place in FIG. 1 at 170 and 171 may be seen in detail in FIG. 13. Referring to FIG. 13, a flexible bellows is secured to a mounting bracket 172 and a similar mounting bracket 173 by means of locking rims 175 circumferentially enclosing the ends of the bellows and forcing locking engagement between the bellows and an internal circumferential lip 175. The bellows are formed of flexible material and are semicompartmentalized through the utilization of restraining girders such as wire members 180 and 181. Each of the brackets 172 and 173 is pivotally secured to a shackle such as 185 and 107 respectively. The mounting bracket 172 is provided with an opening 189 for connection to a hydraulic line 191 which is connected through a "T" 192 (see FIGS. 4 and 5) to hydraulic line 193 which, in turn, will be connected to a conventional hydraulic/air system. The shackle 185 is pivotally secured to a bracket 190 which is attached to the vehicle frame 10. In use, hydraulic fluid is admitted to the interior of the bellows 171, causing the bellows to expand and to raise the frame 10 a predetermined distance. Compressive forces acting on the bellows, such as by the wheels contacting an obstruction on the road, increases the pressure of the fluid within the bellows which is transmitted out of the opening 189 to the hydraulic system. Such hydraulic systems characteristically utilize a pneumatic pressure operating upon a piston, the other side of which provides a predetermined average pressure to the hydraulic fluid. The air acting on the piston is compressible and therefore permits hydraulic fluid to flow into the cylinder thereby permitting bellows such as the bellows 171 to partially collapse in response to the increased force. The bellows system of FIG. 13 includes an integral shock absorber comprising a cylindrical tube 200 having a one-way ball valve 201 positioned therein. The ball valve is oriented to permit hydraulic fluid to flow into the tube 200 but to block flow outwardly from the tube. The tube 200 is secured to the mounting bracket 172. A second tube 205 is secured to the opposing mounting bracket 173 and is also cylindrical, having an outside diameter such that it slides within the tube 200. The tube 205 is provided with a plurality of openings 206 drilled therein to permit hydraulic fluid to flow through the openings from within the tube 205 to the inside of the bellows 171. When a compressive force is applied to the bellows 171, such as by the wheels encountering an obstruction in the road, the tubes 200 and 205 are forced to "telescope," forcing oil to flow from within the tubes out of the holes 206; however, as the tubes continue to telescope, the tube 200 shrouds an increasing number of the holes 206, resulting in an increasing restriction to the flow of fluid from within the tubes and thereby gradually increasing resistance to the compressive force. Motion attempting to expand the bellows meets with a similar action except that the ball valve 201 assists in admitting hydraulic fluid to the interior of the tubes.

The concept of the present invention permits the ready removal of the entire wheel assembly including brakedrum, bearing and spindle and permits the replacement of these parts with prelubricated components. For example, referring specifically to FIG. 11, the brakedrum assembly 68, together with the wheel spindle 55 and associate parts, may quickly be removed by simply unscrewing the locking setscrew 91 to permit the spindle to be moved axially within the spindle carrier 50. The setscrew 99 is left in a position shown engaging the circumferential channel 98 in the ejector shaft 95. A wrench may then be placed on the hexagonal end 100 of the ejector shaft and rotated counterclockwise. The threaded connection between the ejector shaft and the spindle will force the spindle to the left of FIG. 11 and out of the carrier 50. A new or rebuilt and preassembled brakedrum assembly, including bearings and spindle, may then be placed in the carrier 50 to threadedly engage the threaded end 96 of the ejector shaft 95. The wrench is then simply turned clockwise, drawing the spindle into the carrier 50 and causing the extension 105 to puncture the seal 62. The spindle 55 is continued to be drawn into the carrier 50 until the shoulders 56 and 57 come into firm contact. The locking setscrew 91 may then be screwed into the carrier 50 to cause the screw to come into firm contact with the circumferential channel 90 provided in the spindle. The assembly, as mentioned previously, contains the proper amount of lubricant which has been sealed by the seal 77 and the seal 62. Puncturing the seal 62 thus vents the lubricant reservoir formed by the interior opening 60 in the spindle and also permits subsequent supplementation of the lubricant by means of passageway 101 when the level thereof, as viewed through the transparent end cap 80, indicates that additional lubricant is required.

A modification of the ejector shaft and associated mechanism of the present invention is shown in FIG. 15. In that FIG., the spindle carrier 215 includes an opening extending therethrough that is slightly modified from the carrier described previously. The modification includes a smaller diameter portion 216 of the opening which is sized to accommodate and receive a sleeve member 218. The sleeve member includes an annular channel 219 to receive a locking setscrew 220 threadedly extending through the carrier 215. The sleeve 218 is thus locked against axial movement in the carrier 215 while nevertheless permitting an ejector shaft 225 to be rotatably supported thereby. The ejector shaft 225 terminates in a hex-head 226 and extends through the sleeve 218 and includes a shoulder 230 which abuts against the end 231 of the sleeve 218. The locking setscrew 220 thus may be permanently be screwed through the carrier 215 into engagement with the channel 219 to keep the sleeve 218 in position. The ejector shaft 225 may then be rotated without first having to withdraw the locking setscrew 220. The wheel spindle 235 is similar to that described previously and is locked into firm engagement in the carrier 215 by the engagement of the locking setscrew 236 with the annular channel 237. The passageway 239 extends axially through the ejector shaft 225 and an extension 240 having the passageway 239 therein terminates in a pointed tip for puncturing the seal 245. The communication of the passageway with the interior of the spindle 235 is accomplished by an opening 246 positioned on the side of the extension 240 so that the act of puncturing the seal 245 will not cause the passageway 239 to become plugged. The extension 240 may be formed separately from the ejector shaft 225 and may extend axially therethrough such as by threadedly engaging the shaft 225 at the area 250. A fitting 251 may be formed at one end of the passageway to permit the injection of supplement lubricant in the event the lubricant level within the spindle appears low. The embodiment shown in FIG. 15 recognizes the general condition occurring when the wheel spindle is to be replaced. Under normal circumstances, the wheel spindle will be replaced without the necessity of removing or disturbing the ejector shaft, accordingly, the embodiment of FIG. 15 provides a means to permit the ejector shaft to rotate about its axis without first having to "unlock" the shaft and while preventing the ejector shaft from moving axially in the spindle carrier. The wheel spindle is still locked into its carrier by means of a locking setscrew.

I claim:

1. A vehicle wheel mounting assembly comprising: a wheel spindle carrier for mounting on a vehicle frame, said carrier including a substantially horizontal opening extending therethrough having an axis transverse to the normal direction of motion of said vehicle; a wheel spindle mounted in one end of said opening and having a shoulder abutting said carrier; an ejector shaft extending into an opposite end of said opening and threadedly engaging said wheel spindle for drawing said shoulder into firm abutting contact with said carrier when said shaft is rotated in one direction and for ejecting said spindle from said carrier when said shaft is rotated in an opposite direction; locking means engaging said ejector shaft preventing said shaft from moving axially in said opening while permitting said shaft to be rotated about its axis; said wheel spindle including an internal circular tapered opening extending axially of said spindle from its greatest diameter at the end of said spindle remote from said carrier to its least diameter substantially at a position radially inwardly from said shoulder.

2. The combination set forth in claim 1, including a puncturable seal positioned in the tapered opening within said spindle for sealing lubricants within said spindle, and wherein said ejector shaft includes an axially extending passageway therein terminating in a pointed extension for puncturing said seal to join said passageway and the tapered opening in said spindle.

3. The combination set forth in claim 2 wherein said locking means comprises screw means threadedly extending through said carrier and into engagement with an annular channel provided in said ejector shaft and wherein said second locking means comprises screw means threadedly extending through said carrier and into engagement with an annular channel provided in said spindle.

4. A vehicle wheel mounting assembly comprising: a wheel spindle carrier for mounting on a vehicle frame, said carrier including a substantially horizontal opening extending therethrough having an axis transverse to the normal direction of motion of said vehicle; a wheel spindle mounted in one end of said opening and having a shoulder abutting said carrier, said wheel spindle including an axially extending opening for receiving and storing lubricant; an ejector shaft extending into an opposite end of said opening and threadedly engaging said wheel spindle for drawing said shoulder into firm abutting contact with said carrier when said shaft is rotated in one direction and for ejecting said spindle from said carrier when said shaft is rotated in an opposite direction; and locking means engaging said ejector shaft preventing said shaft from moving axially in said opening while permitting said shaft to be rotated about its axis; a puncturable seal positioned in said axially extending opening within said spindle for sealing lubricants within said spindle and wherein said ejector shaft includes an axially extending passageway therein terminating in a pointed extension for puncturing said seal to join said passageway and the axially extending opening in said spindle.

5. A vehicle wheel mounting assembly comprising: a wheel spindle carrier for mounting on a vehicle frame; a hollow oil containing wheel spindle having an open outer end and a closed inner end, said open outer end including a sealing end cap for sealing oil in said spindle; means defining a passageway extending through said closed inner end and communicating with the interior of said hollow wheel spindle to vent the interior of said hollow wheel spindle to the atmosphere; means releasably securing said wheel spindle to said wheel spindle carrier with said spindle extending in a direction transverse to the normal direction of motion of said vehicle; said sealing end cap being constructed of a material to permit visual inspection of the oil level in said hollow wheel spindle, said passageway extending axially through said closed inner end to permit injection of oil into said hollow spindle and to vent the interior of said hollow spindle to the atmosphere.